(12) United States Patent
Okamoto et al.

(10) Patent No.: US 11,060,439 B2
(45) Date of Patent: Jul. 13, 2021

(54) CATALYST DETERIORATION DIAGNOSIS SYSTEM AND CATALYST DETERIORATION DIAGNOSIS METHOD

(71) Applicant: NGK INSULATORS, LTD., Nagoya (JP)

(72) Inventors: Taku Okamoto, Nagoya (JP); Osamu Nakasone, Inabe (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 16/987,435

(22) Filed: Aug. 7, 2020

(65) Prior Publication Data

US 2021/0054774 A1    Feb. 25, 2021

(30) Foreign Application Priority Data

Aug. 21, 2019 (JP) .............................. JP2019-151170

(51) Int. Cl.
*F01N 11/00*        (2006.01)
*F02D 41/14*        (2006.01)
(Continued)

(52) U.S. Cl.
CPC ............ *F01N 11/007* (2013.01); *F01N 3/101* (2013.01); *F02D 41/1459* (2013.01);
(Continued)

(58) Field of Classification Search
CPC .............. F02D 41/1459; F02D 41/146; F02D 41/1461; F02D 41/1462; F02D 41/1463; F02D 41/1465; F02D 41/1495; F01N 11/007; F01N 2550/02; F01N 2560/023; F01N 2560/026
(Continued)

(56) References Cited

U.S. PATENT DOCUMENTS 9,670,819 B2    6/2017  Aoki et al.
2010/0083637 A1*  4/2010  Sawada ................. F01N 3/0871
                                                    60/277
(Continued)

FOREIGN PATENT DOCUMENTS

JP        2006-017078 A     1/2006
JP        5835478 B2        12/2015

*Primary Examiner* — Erick R Solis
(74) *Attorney, Agent, or Firm* — Mattingly & Malur, PC

(57) ABSTRACT

A system of diagnosing a deterioration of a catalyst, which includes a precious metal component and a ceramic part and purifies an exhaust gas emitted from an engine, includes: a diagnosis means comparing a diagnosis object value corresponding to an output from an NOx sensor provided on a downstream side with respect to the catalyst and a predetermined diagnosis threshold value stored in a storage means, thereby diagnosing a degree of deterioration of the catalyst, wherein the diagnosis threshold value is previously determined based on a correlationship between the diagnosis object value and a total weight value of NOx and THC in the exhaust gas through the catalyst in a state where the vehicle travels under a constant threshold value setting condition, and the diagnosis means diagnoses that a deterioration occurs in the precious metal component when the diagnosis object value exceeds the diagnosis threshold value.

6 Claims, 11 Drawing Sheets

(51) Int. Cl.
*F01N 3/10* (2006.01)
*F02D 41/30* (2006.01)
*F02D 41/00* (2006.01)

(52) U.S. Cl.
CPC ..... *F02D 41/1463* (2013.01); *F02D 41/1495* (2013.01); *F01N 2550/02* (2013.01); *F01N 2560/023* (2013.01); *F01N 2560/026* (2013.01); *F02D 41/0002* (2013.01); *F02D 41/30* (2013.01)

(58) Field of Classification Search
USPC .......... 701/103; 73/114.75; 123/690; 60/277, 60/299, 301
See application file for complete search history.

(56) References Cited

U.S. PATENT DOCUMENTS

| | | | |
|---|---|---|---|
| 2018/0094564 A1* | 4/2018 | Okamoto | G01N 27/4067 |
| 2019/0049418 A1* | 2/2019 | Smith | G01N 33/0037 |
| 2020/0109656 A1* | 4/2020 | Nakasone | F02D 41/1446 |

* cited by examiner

F I G. 5
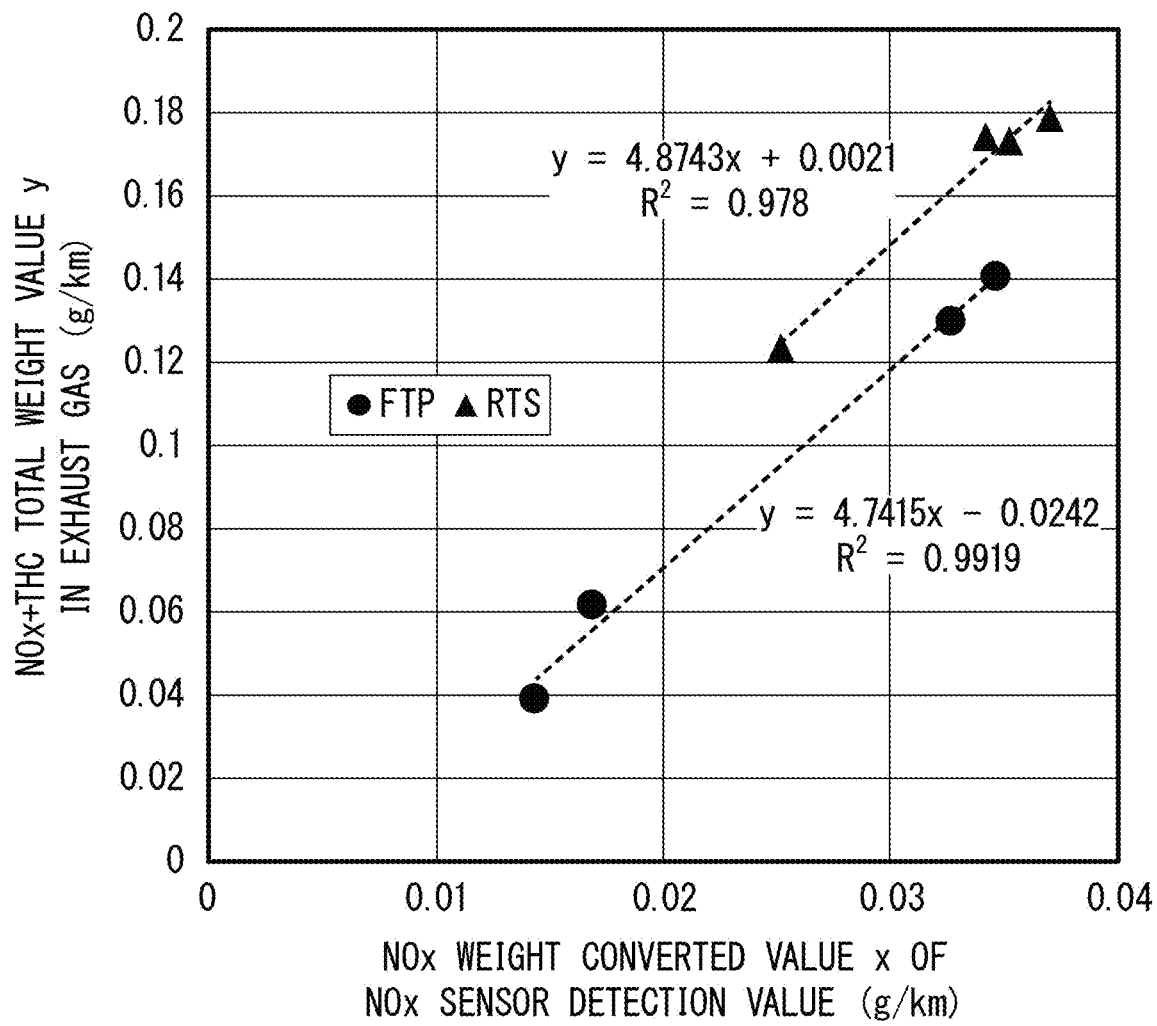

CATALYST DETERIORATION DIAGNOSIS SYSTEM AND CATALYST DETERIORATION DIAGNOSIS METHOD

CROSS-REFERENCE TO RELATED APPLICATION

The present application claims priority from Japanese application JP2019-151170, filed on Aug. 21, 2019, the contents of which is hereby incorporated by reference into this application.

BACKGROUND OF THE INVENTION

Field of the Invention

The present invention relates to a system and a method with which a deterioration degree of a catalyst is diagnosed, and more particularly to a diagnosis system and a diagnosis method for a catalyst into which an exhaust gas from an internal combustion engine mounted in a vehicle is introduced.

Description of the Background Art

A gasoline engine mounted in a vehicle (typically, an automobile) emits an exhaust gas containing toxic substances, namely, nitrogen oxide (NOx), total hydrocarbon (THC), and carbon monoxide (CO), at the time of operation of the gasoline engine. These types of gas are subject to a discharge regulation, and therefore, in many gasoline engine vehicles, a catalyst that collectively removes these three contained substances (purifies an exhaust gas), i.e., a three way catalyst (TWC), is mounted.

The three way catalyst includes a part made of precious metal, such as palladium (Pd), platinum (Pt), and rhodium (Rh), and a part made of ceramics mainly containing ceria ($CeO_2$). The part made of precious metal causes main catalytic action. The part made of ceramics serves as a promoter. Pd and Pt have a function of oxidizing HC and CO in an exhaust gas to generate carbon dioxide ($CO_2$) and water ($H_2O$). Further, Pd and Rh have a function of reducing NOx in an exhaust gas to generate nitrogen ($N_2$). Ceria has a function of causing absorption and elimination of oxygen ($O_2$). In the TWC, when HC and CO are oxidized, necessary oxygen is released from ceria, and when NOx is reduced, generated oxygen is absorbed into (stored in) ceria.

A gasoline engine is mainly operated with reference to a stoichiometric state in which its air-fuel ratio (A/F) is equal to a stoichiometric air-fuel ratio or has a value close to a stoichiometric air-fuel ratio and fuel introduced into an engine cylinder is completely burned, however, depending on a condition of a vehicle, operation is performed with an operation state appropriately transitioned also to a lean state in which A/F is higher than a stoichiometric state or to a rich state in which A/F is lower than a stoichiometric state. In the stoichiometric state out of these states, a TWC can remove all HC, CO, and NOx at a high removal rate.

More specifically, a removal rate of a TWC with regard to NOx is relatively high during rich operation (in a reduced atmosphere) and during stoichiometric operation, and is relatively low during lean operation (in an atmosphere with excessive oxygen). Conversely, a removal rate of a TWC with regard to HC and CO is relatively high during lean operation and during stoichiometric operation, and is relatively low during rich operation. This is because, during rich operation, an oxygen content in an exhaust gas is low and therefore NOx can be easily reduced, whereas, during lean operation, an oxygen content in an exhaust gas is high and therefore HC and CO can be easily oxidized during lean operation.

In other words, there is a tendency that HC and CO are easily emitted from the TWC purifying the exhausted gas in rich operation, while NOx is easily emitted from the TWC purifying the exhausted gas in lean operation. $NH_3$ which is not emitted from a gasoline engine itself is also emitted from the former TWC.

A TWC is deteriorated through long-term continuous use. A TWC is deteriorated in various manners. Some of main deterioration modes include overall removal efficiency reduction in a rich state and a lean state, removal efficiency reduction in a lean state, and removal efficiency reduction in a rich state.

Meanwhile, in recent years, automobiles are required by law to implement on-board diagnostics (OBD) and TWCs are included in a diagnostic target.

OBD on TWCs may be implemented with an oxygen storage capacity (OSC) method, for example. This is based on the premise that removal capability of a three way catalyst is higher as oxygen absorption capability (oxygen storage amount) of ceria is higher, and deterioration of a TWC appears as deterioration in oxygen absorption capability (oxygen storage amount) of ceria.

A Cmax method as one aspect of an OSC method has been known (see, for example, Japanese Patent Application Laid-Open No. 2006-17078 and Japanese Patent No. 5835478).

However, an OSC method, such as a Cmax method, only allows evaluation of a deterioration degree of oxygen absorption capability of ceria provided in a TWC, and deterioration behavior of a precious metal part for causing oxidation and reduction, which are directly related to purification, cannot be directly understood.

Further, there is also a problem in that an oxygen absorption amount of ceria provided in a TWC has a small correlation with gas components contained in an exhaust gas from an engine, such as HC, CO, and NOx.

SUMMARY

The present invention is directed to a system and a method with which a deterioration degree of a catalyst is diagnosed, and more particularly to a diagnosis system and a diagnosis method for a catalyst into which an exhaust gas from an internal combustion engine mounted in a vehicle is introduced.

According to the present invention, a system of diagnosing a degree of deterioration of a catalyst purifying an exhaust gas emitted from an internal combustion engine mounted in a vehicle, the catalyst including a precious metal component and a ceramic part, the system includes: a drive control element configured and disposed to control intake air and a fuel injection in the internal combustion engine, thereby controlling a drive state of the internal combustion engine; an NOx sensor located on a downstream side with respect to the catalyst in an exhaust path of the exhaust gas; a diagnosis element configured and disposed to compare at least a diagnosis object value corresponding to an output from the NOx sensor and a predetermined diagnosis threshold value, thereby diagnosing a degree of deterioration of the catalyst; and a storage element storing the diagnosis threshold value, wherein the diagnosis threshold value is previously determined based on a correlationship between the diagnosis object value and at least a total weight value of NOx and THC in the exhaust gas through the catalyst in a state where the vehicle travels under a constant threshold value setting condition, and the diagnosis element diagnoses that a deterioration occurs in the precious metal component in the catalyst when the diagnosis object value obtained while the vehicle travels under a diagnosable condition exceeds the diagnosis threshold value.

Accordingly, the degree of deterioration of the precious metal component of the catalyst can be diagnosed more preferably than the case of diagnosing only the exhaust amount of NOx based on the detection value in the NOx sensor provided on the downstream side with respect to the catalyst.

Therefore, an object of the present invention is to provide a system and a method with which a degree of deterioration of a precious metal component of a TWC can be preferably diagnosed.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a drawing in which a total weight value of NOx+THC per unit of travel distance is plotted with respect to an NOx weight converted value per unit of travel distance in an example 1.

DESCRIPTION OF THE PREFERRED EMBODIMENTS

<Configuration of System>

Figure 1:
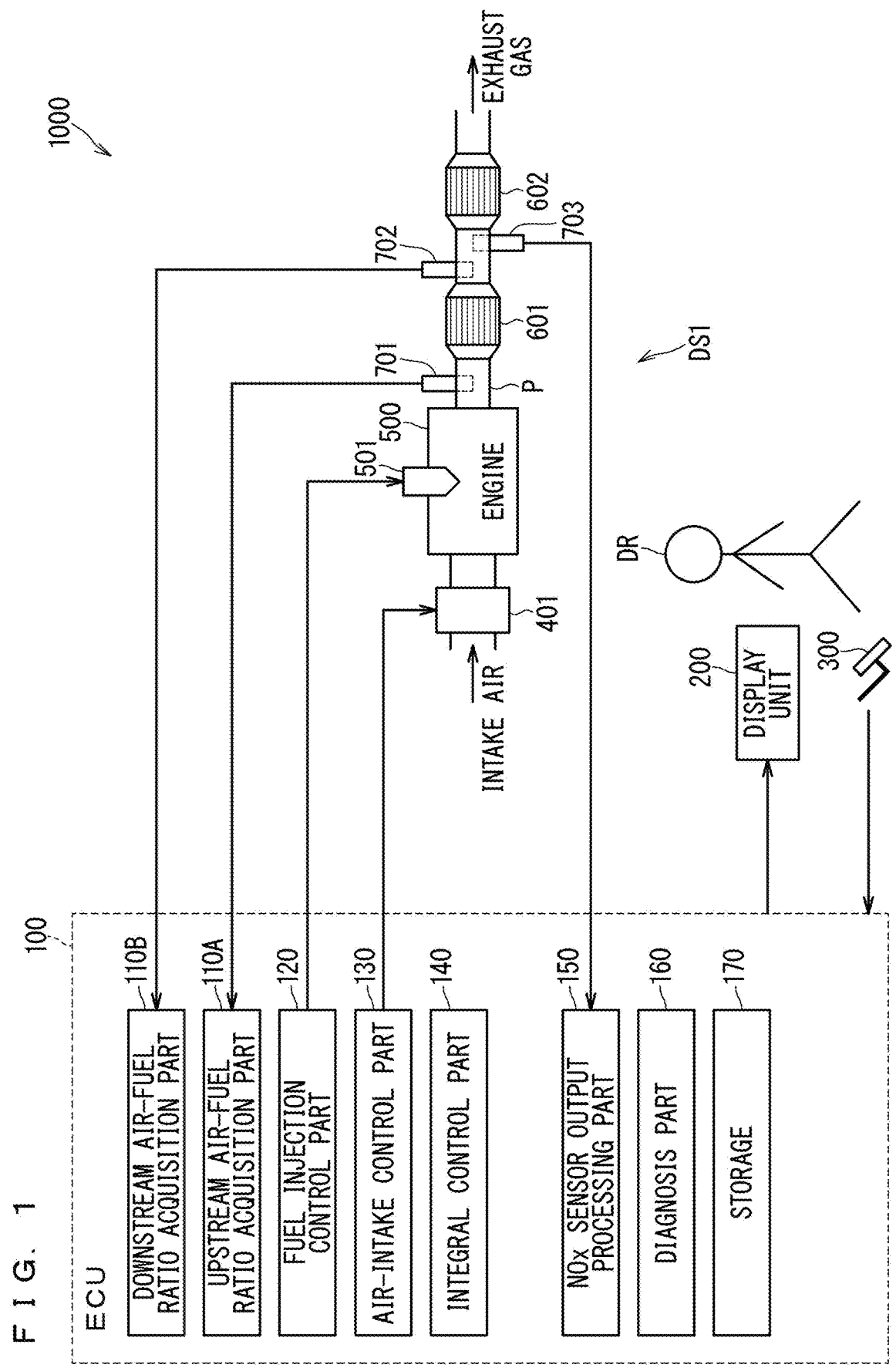
FIG. 1 is a drawing schematically illustrating a configuration of a vehicle (system).

FIG. 1 is a drawing schematically illustrating a configuration of a vehicle (system) 1000 according to the present embodiment. In present embodiment, the vehicle 1000 is an automobile driven by a driver DR.

The vehicle 1000 mainly includes a gasoline engine (hereinafter simply referred to as an engine) 500 that is a type of an internal combustion engine and serves as a source of power, a fuel injection device 501 that injects fuel into the inside (combustion chamber) of the engine 500, an air-intake unit 401 that supplies air to the engine 500, a three way catalyst (TWC) 601 that purifies an exhaust gas emitted from the engine 500, an electronic control device (ECU) 100 that controls operation of each unit of the vehicle 1000, a display unit 200 such as an instrument panel for presenting the driver DR with various pieces of information related to the vehicle 1000, and an accelerator pedal 300 that is one of various operation units operated by the driver DR when the driver DR operates the vehicle 1000. Note that other examples of the operation units include a steering wheel, a shift lever (selector) for a transmission, and a brake pedal (none of which is shown).

The air-intake unit 401 and the TWC 601 are connected to the engine 500 with respective pipes P. A path for a gas from the air-intake unit 401 to the engine 500 is hereinafter referred to as a supply side or an air-intake path, whereas a path for a gas from the engine 500 to the TWC 601 is referred to as an exhaust side or an exhaust path. Further, a side on the engine 500 with respect to the TWC 601 is referred to as an upstream side, whereas a side on the opposite side of the engine 500 with respect to the TWC 601 is referred to as a downstream side, based on a flow of an exhaust gas in which an exhaust gas is emitted from the engine 500, introduced into the TWC 601, and is further emitted from the TWC 601.

To give a brief description, power is generated in the vehicle 1000 in the following manner: an air-fuel mixture, which is a mixture of air (intake air) taken from the outside through the air-intake unit 401 and fuel injected from the fuel injection device 501, is compressed in the engine 500; the compressed air-fuel mixture is ignited with a spark plug (not shown); the ignition causes the compressed air-fuel mixture to be exploded and burned, and to be expanded; pressure generated at this time moves a piston (not shown), thus generating power. Then, a gas generated through such power generation is emitted as an exhaust gas to the exhaust path, such that the exhaust gas is purified by the TWC 601.

The exhaust gas contains toxic substances, namely, nitrogen oxide (NOx), total hydrocarbon (THC), and carbon monoxide (CO). The TWC 601 is capable of collectively removing these three contained substances (purifying an exhaust gas) at respective high removal rates.

The TWC 601 includes a part made of precious metal, such as palladium (Pd), platinum (Pt), and rhodium (Rh), and a part made of ceramics mainly containing ceria ($CeO_2$). The part made of precious metal causes main catalytic action. The part made of ceramics serves as a promoter. Pd and Pt have a function of oxidizing HC and CO in an exhaust gas to generate carbon dioxide ($CO_2$) and water ($H_2O$). Pd and Rh have a function of reducing NOx in an exhaust gas to generate nitrogen ($N_2$). Ceria has a function of causing absorption and elimination of oxygen ($O_2$). In the TWC 601, when HC and CO are oxidized, necessary oxygen is released from ceria, and when NOx is reduced, generated oxygen is absorbed into (stored in) ceria.

In the present embodiment, the TWC 601 in a normal state without deterioration is capable of the following function: when the engine 500 is in a stoichiometric state (state in which an air-fuel ratio of an exhaust gas has a stoichiometric value (approximately 14.7)) or a rich state (state in which an air-fuel ratio of an exhaust gas has a value smaller than the stoichiometric value), the TWC 601 removes NOx at a high removal rate of 90% or more (reduces NOx to $N_2$); when the engine 500 is in a stoichiometric state or a lean state (state in which an air-fuel ratio of an exhaust gas has a value larger than the stoichiometric value), the TWC 601 removes HC and CO at a high removal rate of 90% or more (oxidizes HC and CO to $H_2O$ and $CO_2$, respectively).

The vehicle 1000 further includes an upstream air-fuel ratio detection means 701, a downstream air-fuel ratio detection means 702, and an NOx sensor 703. The upstream air-fuel ratio detection means 701 is provided on the pipe P connecting the engine 500 and the TWC 601 on an upstream side with respect to the TWC 601. The downstream air-fuel ratio detection means 702 and the NOx sensor 703 are provided on the pipe P on a downstream side with respect to the TWC 601. Note that, in FIG. 1, the downstream air-fuel ratio detection means 702 and the NOx sensor 703 are separately illustrated. However, both the means may be formed integrally with each other. In addition, the NOx sensor 703 may be capable of performing both detection in parallel.

The upstream air-fuel ratio detection means 701 and the downstream air-fuel ratio detection means 702 are disposed to measure an air-fuel ratio of an exhaust gas on an upstream side and a downstream side of the TWC 601, respectively. The NOx sensor 703 is disposed to measure NOx concentration in an exhaust gas on a downstream side of the TWC 601. Outputs from these detection means are used for the purpose of driving control of the vehicle 1000. In addition to the purpose of driving control, the NOx sensor 703 is also used when a degree of deterioration of the TWC 601 is diagnosed.

Specifically, in the present embodiment, a catalyst deterioration diagnosis system DS1 for diagnosing a degree of deterioration of the TWC 601 includes, as its main components, the NOx sensor 703 and the ECU 100. A detailed configuration of the NOx sensor 703 and details of a diagnosis conducted with the catalyst deterioration diagnosis system DS1 will be described later.

The ECU 100 includes an electronic circuit including at least one integrated circuit (IC). The electronic circuit includes at least one processor (not shown). Each function of the ECU 100 can be implemented by the processor executing software. The software is described as a program, and is stored in memory (not shown). The memory for storing the program may be included in the ECU 100. For example, the memory is non-volatile or volatile semiconductor memory.

The ECU 100 includes, as its functional components, an upstream air-fuel ratio acquisition part 110A, a downstream air-fuel ratio acquisition part 110B, a fuel injection control part 120, an air-intake control part 130, an integral control part 140, an NOx sensor output processing part 150, a diagnosis part 160, and a storage part 170.

The upstream air-fuel ratio acquisition part 110A and the downstream air-fuel ratio acquisition part 110B acquire an air-fuel ratio signal from the upstream air-fuel ratio detection means 701 and the downstream air-fuel ratio detection means 702, respectively. The air-fuel ratio signal needs not necessarily be acquired as an air-fuel ratio itself, and may be acquired as a voltage value or a current value according to the air-fuel ratio.

The fuel injection control part 120 controls injection of fuel from the fuel injection device 501, in accordance with a control command from the integral control part 140 according to an operation state of the accelerator pedal 300 operated by the driver DR, for example.

The air-intake control part 130 controls intake of air from the air-intake unit 401, in accordance with a control command from the integral control part 140 according to an operation state of the accelerator pedal 300 operated by the driver DR, for example.

The integral control part 140 integrally controls overall operation of the vehicle 1000 including driving and traveling, through giving a control command to each control part of the ECU 100, according to a state of operation performed by the driver DR on operation units such as the accelerator pedal 300.

The NOx sensor output processing part 150 acquires a signal value (NOx sensor detection value) being output from the NOx sensor 703, and has a function of converting the acquired NOx sensor detection value into a value in a predetermined form (diagnosis target value) used in the deterioration diagnosis performed by the catalyst deterioration diagnosis system DS1. Note that the NOx sensor detection value needs not necessarily be a concentration value of the detected NOx itself, and may be a current value (NOx current value) giving the concentration value as described hereinafter.

Specific examples of the diagnosis object value include an NOx weight converted value (per unit of travel distance) generated through conversion of NOx detected per unit of travel distance into a weight value, and additionally a normalized value (normalized NOx weight converted value) of the NOx weight converted value by an amount of fuel to be used.

The diagnosis part 160 diagnoses a degree of deterioration of the TWC 601 based on the diagnoses object value generated in the NOx sensor output processing part 150. Details of the deterioration diagnosis process in the diagnosis part 160 will be described later.

The storage part 170 stores various pieces of information, such as various programs and pieces of data required at the time of driving of the vehicle 1000, and a driving condition and a diagnosis threshold value at the time of a deterioration diagnosis.

In the vehicle 1000, an additional catalyst 602 may be provided on a further downstream side of the downstream air-fuel ratio detection means 702 and the NOx sensor 703. For example, the additional catalyst 602 is another TWC, a gasoline particulate filter (GPF), or a selective catalytic reduction (SCR) catalyst. In this case, an exhaust gas from the engine 500 is more preferably purified.

<Outline of NOx Sensor>

Figure 2:
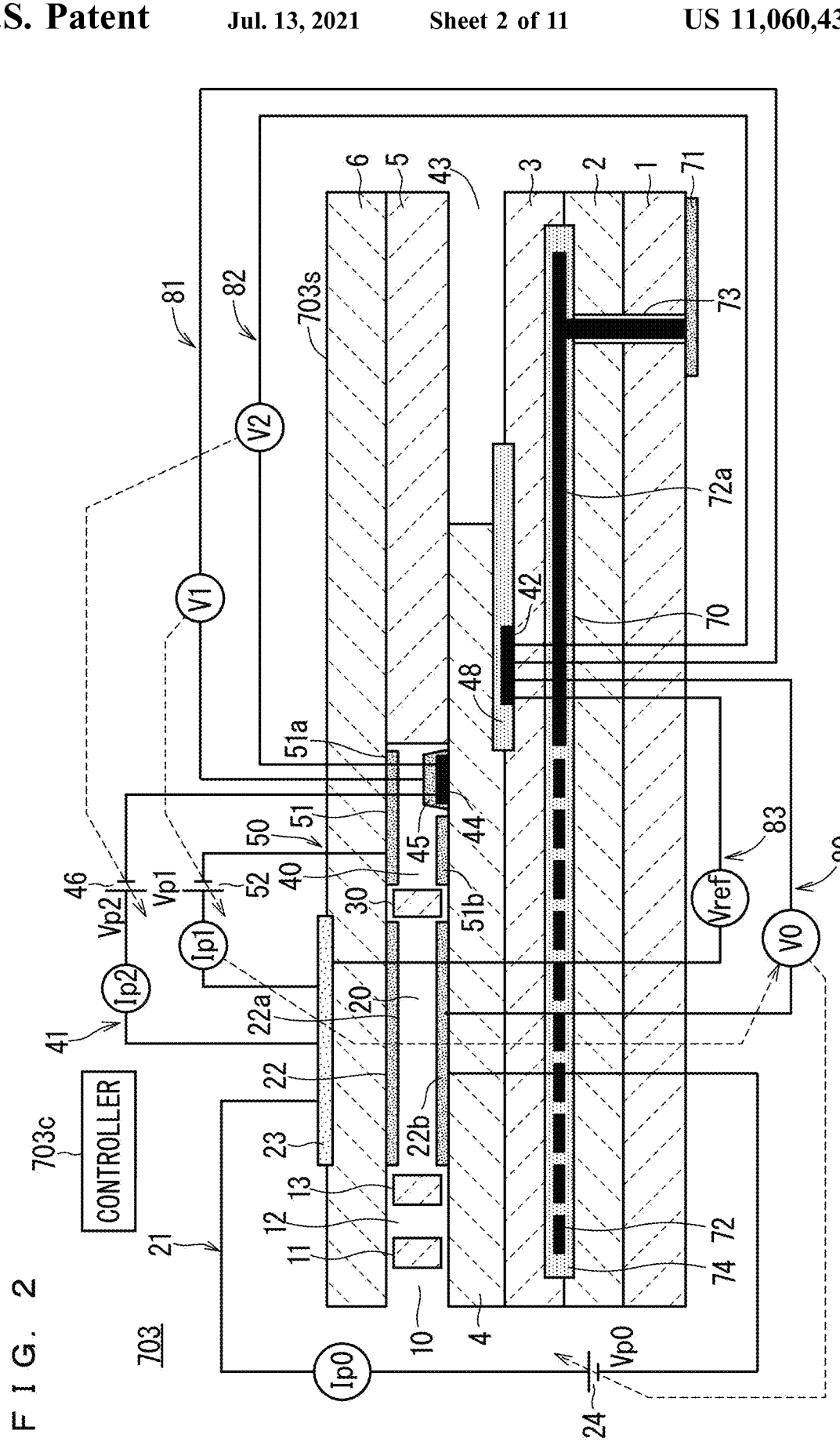
FIG. 2 is a drawing schematically illustrating an example of a configuration of an NOx sensor.

A schematic configuration of the NOx sensor 703 is described next. FIG. 2 is a drawing schematically illustrating an example of a configuration of the NOx sensor 703 including a vertical cross-sectional view along a longitudinal direction of a sensor element 703*s*. In the present embodiment, the NOx sensor 703 is a limited current type sensor detecting NOx using the sensor element 703*s* to measure concentration thereof. The NOx sensor 703 further includes a controller 703*c* controlling operation of each part and specifying the NOx concentration based on the NOx current flowing in the sensor element 703*s*. A known NOx sensor is applicable to the NOx sensor 703.

The sensor element 703*s* is a flat plate-like (elongated plate-like) element having a structure made up of six solid electrolyte layers of a first substrate layer 1, a second substrate layer 2, a third substrate layer 3, a first solid electrolyte layer 4, a spacer layer 5, and a second solid electrolyte layer 6, each of which is made of an oxygen ion conductive solid electrolyte, namely zirconia ($ZrO_2$) (for example, made of yttria-stabilized zirconia (YSZ)), stacked in this order from a lower side when seeing the drawings. The solid electrolyte forming these six layers is dense and airtight. A surface on an upper side of each of the six layers in FIG. 2 is simply referred to as an upper surface, and a surface on a lower side thereof is simply referred to as a lower surface in some cases hereinafter. A whole part of the sensor element 703s made up of the solid electrolyte is collectively referred to as a base part.

The sensor element 703s is manufactured by performing predetermined processing and printing a circuit pattern on a ceramic green sheet corresponding to each layer, then laminating the green sheets, and further firing to integrate them with each other, for example.

A gas inlet 10, a first diffusion control part 11, a buffer space 12, a second diffusion control part 13, a first inner space 20, a third diffusion control part 30, and a second inner space 40 are adjacently formed to be communicated with each other in this order between a lower surface of the second solid electrolyte layer 6 and an upper surface of the first solid electrolyte layer 4 in a leading end of the sensor element 703s.

The gas inlet 10, the buffer space 12, the first inner space 20, and the second inner space 40 are spaces in the sensor element 703s that look as if they were provided by hollowing out the spacer layer 5, an upper part thereof defined by the lower surface of the second solid electrolyte layer 6, a lower part thereof defined by the upper surface of the first solid electrolyte layer 4, and a side part thereof defined by the side surface of the spacer layer 5.

Each of the first diffusion control part 11, the second diffusion control part 13, and the third diffusion control part 30 is provided as two horizontally long slits (with an opening having a longitudinal direction perpendicular to the drawing sheet of FIG. 2). A region from the gas inlet 10 to the second inner space 40 is also referred to as a gas distribution part.

A reference gas introduction space 43 is provided in a position farther away from the leading end side in relation to the gas introduction part between the upper surface of the third substrate layer 3 and the lower surface of the spacer layer 5, a side part thereof defined by a side surface of the first solid electrolyte layer 4. Atmospheric air, for example, is introduced into the reference gas introduction space 43 as a reference gas in measuring the NOx concentration.

An atmospheric air introduction layer 48 is a layer formed of porous alumina, and the reference gas is introduced into the atmospheric air introduction layer 48 through the reference gas introduction space 43. The atmospheric air introduction layer 48 is formed to cover a reference electrode 42.

The reference electrode 42 is an electrode having a configuration of being sandwiched between the upper surface of the third substrate layer 3 and the first solid electrolyte layer 4, and the atmospheric air introduction layer 48 leading to the reference gas introduction space 43 is provided around the reference electrode 42 as described above.

The gas inlet 10 is a portion having an opening to an outer space in the gas introduction part, and the measurement gas is taken into the sensor element 703s from the outer space through the gas inlet 10.

The first diffusion control part 11 is a portion for providing the measurement gas taken from the gas inlet 10 of the predetermined diffusion resistance.

The buffer space 12 is a space provided for leading the measurement gas, which is introduced from the first diffusion control part 11, to the second diffusion control part 13. The buffer space 12 is provided so that a pulsation of an exhaust gas pressure does not influence the measurement in the NOx sensor 703.

The second diffusion control part 13 is a portion for providing the measurement gas introduced from the buffer space 12 to the first inner space 20 of the predetermined diffusion resistance.

The first inner space 20 is provided as a space for adjusting the oxygen partial pressure in the measurement gas introduced through the second diffusion control part 13. The oxygen partial pressure is adjusted by an operation of a main pump cell 21.

The main pump cell 21 is an electrochemical pump cell constituted by the inner pump electrode 22 (22a, 22b) facing the first inner space 20, an external (out-of-inner-space) pump electrode 23 provided to be exposed to the outer space on the upper surface of the second solid electrolyte layer 6 (one main surface of the sensor element 703s), and the second solid electrolyte layer 6 sandwiched between the electrodes 22 and 23.

The inner pump electrode 22 is formed to have a rectangular shape in a plan view as a porous cermet electrode made of an Au—Pt alloy and $ZrO_2$.

In the meanwhile, the external pump electrode 23 is formed to have a rectangular shape in a plan view as a porous cermet electrode made of Pt or a Pt alloy and $ZrO_2$, for example.

In the main pump cell 21, a desired pump voltage Vp0 is applied between the inner pump electrode 22 and the external pump electrode 23 by a variable source 24, and a main pump current Ip0 is flowed between the inner pump electrode 22 and the external pump electrode 23 in a positive direction or a negative direction, thus oxygen in the first inner space 20 can be pumped out to the outer space or oxygen in the outer space can be pumped into the first inner space 20. The pump voltage Vp0 applied between the inner pump electrode 22 and the external pump electrode 23 in the main pump cell 21 is also referred to as the main pump voltage Vp0.

The inner pump electrode 22, the second solid electrolyte layer 6, the spacer layer 5, the first solid electrolyte layer 4, the third substrate layer 3, and the reference electrode 42 constitute an electrochemical sensor cell, namely a main sensor cell 80 to detect the oxygen concentration (oxygen partial pressure) in the atmosphere in the first inner space 20.

The oxygen concentration (oxygen partial pressure) in the first inner space 20 can be figured out by measuring an electromotive force V0 in the main sensor cell 80.

Furthermore, the controller 703c performs a feedback control on the main pump voltage Vp0 so that the electromotive force V0 is set to constant, thus the main pump current Ip0 is controlled. Accordingly, the oxygen concentration in the first inner space 20 is maintained to have a predetermined constant value.

The third diffusion control part 30 is a portion of providing the measurement gas, whose oxygen concentration (oxygen partial pressure) is controlled by operation of the main pump cell 21 in the first inner space 20, of a predetermined diffusion resistance, and guiding the measurement gas to the second inner space 40.

The second inner space 40 is provided as a space for performing processing according to the measurement of nitrogen oxide (NOx) in the measurement gas introduced through the third diffusion control part 30. The NOx concentration is measured mainly in the second inner space 40 where the oxygen concentration is adjusted by an auxiliary pump cell 50, by operation of a measurement pump cell 41.

The oxygen concentration (oxygen partial pressure) is previously adjusted in the first inner space 20, and subsequently, in the second inner space 40, the adjustment of the oxygen partial pressure is further performed by the auxiliary pump cell 50 on the measurement gas introduced through the third diffusion control part 30.

The auxiliary pump cell 50 is an auxiliary electrochemical pump cell constituted by an auxiliary pump electrode 51 (51a, 51b) provided to face the second inner space 40, the external pump electrode 23, and the second solid electrolyte layer 6.

The auxiliary pump electrode 51 is also formed to have a rectangular shape in a plan view as a porous cermet electrode made of an Au—Pt alloy and $ZrO_2$ in the manner similar to the inner pump electrode 22.

In the auxiliary pump cell 50, a desired pump voltage Vp1 is applied between the auxiliary pump electrode 51 and the external pump electrode 23 under control of the controller 703c, thus oxygen in the atmosphere in the second inner space 40 can be pumped out to the outer space or oxygen can be pumped from the outer space into the second inner space 40.

The auxiliary pump electrode 51, the reference electrode 42, the second solid electrolyte layer 6, the spacer layer 5, the first solid electrolyte layer 4, and the third substrate layer 3 constitute an electrochemical sensor cell, namely an auxiliary sensor cell 81 to control the oxygen partial pressure in the atmosphere in the second inner space 40.

The auxiliary pump cell 50 performs pumping with a variable source 52 on which a voltage control is performed based on an electromotive force V1 corresponding to the oxygen partial pressure in the second inner space 40 detected in the auxiliary sensor cell 81. Accordingly, the oxygen partial pressure in the atmosphere in the second inner space 40 is controlled so that it is low enough not to substantially influence the measurement of NOx.

In accordance with this, an auxiliary pump current Ip1 thereof is used for controlling the electromotive force of the main sensor cell 80. Specifically, the auxiliary pump current Ip1 is input, as a control signal, into the main sensor cell 80, and, through control of the electromotive force V0 thereof, the oxygen partial pressure in the measurement gas introduced through the third diffusion control part 30 into the second inner space 40 is controlled to have a gradient that is always constant. When being used as an NOx sensor, the oxygen concentration in the second inner space 40 is maintained to have a constant value of approximately 0.001 ppm by the functions of the main pump cell 21 and the auxiliary pump cell 50.

The measurement pump cell 41 measures the NOx concentration in the measurement gas in the second inner space 40. The measurement pump cell 41 is an electrochemical pump cell constituted by a measurement electrode 44 provided on the upper surface of the first solid electrolyte layer 4 facing the second inner space 40 in a position separated from the third diffusion control part 30, the external pump electrode 23, the second solid electrolyte layer 6, the spacer layer 5, and the first solid electrolyte layer 4.

The measurement electrode 44 is formed as a cermet electrode made of Pt or an alloy of Pt and $ZrO_2$. The measurement electrode 44 also functions as an NOx reduction catalyst for reducing NOx in the atmosphere in the second inner space 40. Furthermore, the measurement electrode 44 is covered with a fourth diffusion control part 45.

The fourth diffusion control part 45 is a film formed of a porous material mainly containing alumina ($Al_2O_3$). The fourth diffusion control part 45 has a function of limiting an amount of NOx flowing into the measurement electrode 44, and also functions as a protection film of the measurement electrode 44.

The measurement pump cell 41 can pump out oxygen generated by the resolution of NOx in the atmosphere around the measurement electrode 44 and detect a generation amount of oxygen as a pump current Ip2 under control of the controller 703c.

The second solid electrolyte layer 6, the spacer layer 5, the first solid electrolyte layer 4, the third substrate layer 3, the measurement electrode 44, and the reference electrode 42 constitute an electrochemical sensor cell, namely a measurement sensor cell 82 to detect the oxygen partial pressure around the measurement electrode 44. A variable source 46 is controlled based on an electromotive force V2, which corresponds to the oxygen partial pressure around the measurement electrode 44, detected in the measurement sensor cell 82.

The measurement gas introduced into the second inner space 40 reaches the measurement electrode 44 through the fourth diffusion control part 45 under a condition where the oxygen partial pressure is controlled. NOx in the measurement gas around the measurement electrode 44 is reduced ($2NO \rightarrow N_2 + O_2$), and oxygen is generated. The generated oxygen is pumped by the measurement pump cell 41. At this time, a voltage Vp2 of the variable source 46 is controlled so that the electromotive force V2 detected in the measurement sensor cell 82 is set to constant. Since the amount of oxygen generated around the measurement electrode 44 is proportional to the NOx concentration in the measurement gas, the NOx concentration in the measurement gas is calculated using the pump current Ip2 in the measurement pump cell 41. The pump current Ip2 is also referred to as the NOx current Ip2 hereinafter.

The second solid electrolyte layer 6, the spacer layer 5, the first solid electrolyte layer 4, the third substrate layer 3, the external pump electrode 23, and the reference electrode 42 constitute an electrochemical sensor cell 83, and the oxygen partial pressure in the measurement gas outside the sensor can be detected by an electromotive force Vref obtained by the sensor cell 83.

The sensor element 703s further includes a heater part 70 having a function of adjusting a temperature for heating the sensor element 703s and keeping the temperature, in order to increase oxygen ion conductivity of the solid electrolyte constituting the base part.

In the heater part 70, power is supplied from a heater power source provided outside the sensor element 703s through a heater electrode 71, a through hole 73, and a heater lead 72a which are a power supply path to make a heater element (resistance heating element) 72 generate heat, thereby being capable of heating each part of the sensor element 703s and keeping each part to a predetermined temperature. The heater element 72 is formed of Pt or mainly of Pt. The heating processing increases the oxygen ion conductivity of the solid electrolyte constituting the base part in the sensor element 703s. The heating temperature at the time of heating by the heater element 72 in a case of using the NOx sensor 703 (in a case of driving the sensor element 703s) is referred to as a sensor element driving temperature.

In the NOx sensor 703 having such a configuration, oxygen contained in the measurement gas is pumped out through the operation of the main pump cell 21 and further of the auxiliary pump cell 50, and the measurement gas whose oxygen partial pressure is lowered enough not to substantially influence the measurement of NOx (for example, 0.0001 ppm to 1 ppm) reaches the measurement electrode 44. In the measurement electrode 44, NOx in the reached measurement gas is reduced, and oxygen is generated. The generated oxygen is pumped out by the measurement pump cell 41. The NOx current Ip2 flowing at the time of pumping out oxygen has a certain functional relationship with the concentration of NOx in the measurement gas (referred to as sensitivity characteristics hereinafter).

The sensitivity characteristics are previously specified using a plural types of model gas whose NOx concentrations are already known in advance of the actually use of the NOx sensor 703, and data thereof is stored in the controller 703c. In the actual use of the NOx sensor 703, signals indicating a value of the NOx current Ip2 flowing in accordance with the NOx concentration in the measurement gas is provided to the controller 703c from moment to moment. In the controller 703c, the NOx concentration is continuously calculated based on the value and the specified sensitivity characteristics and output to the NOx sensor output processing part 150 in the ECU 100 as the NOx sensor detection value. Accordingly, in the ECU 100, the NOx concentration in the measurement gas can be obtained almost in real time.

Alternatively, also applicable is a configuration that the ECU 100 has data of sensitivity characteristics directly in the storage part 170, for example, and in the deterioration diagnosis, the value of the NOx current Ip2 measured in the NOx sensor 703 is directly output to the NOx sensor output processing part 150 as the NOx sensor detection value, and the value of the NOx current Ip2 obtained by the NOx sensor output processing part 150 is converted into a diagnosis object value.

<Deterioration Diagnosis>

Described next is a process of diagnosing a degree of deterioration (deterioration diagnosis) of the TWC 601 performed in the present embodiment.

In the present embodiment, the diagnosis object value generated by the NOx sensor output processing part 150 based on the NOx sensor detection value being output from the NOx sensor 703 is used in the deterioration diagnosis as descried above. In outline, the diagnosis object value is compared with a predetermined diagnosis threshold value stored in the storage part 170, and the degree of deterioration of the TWC 601 is diagnosed based on a result thereof.

Figure 3:
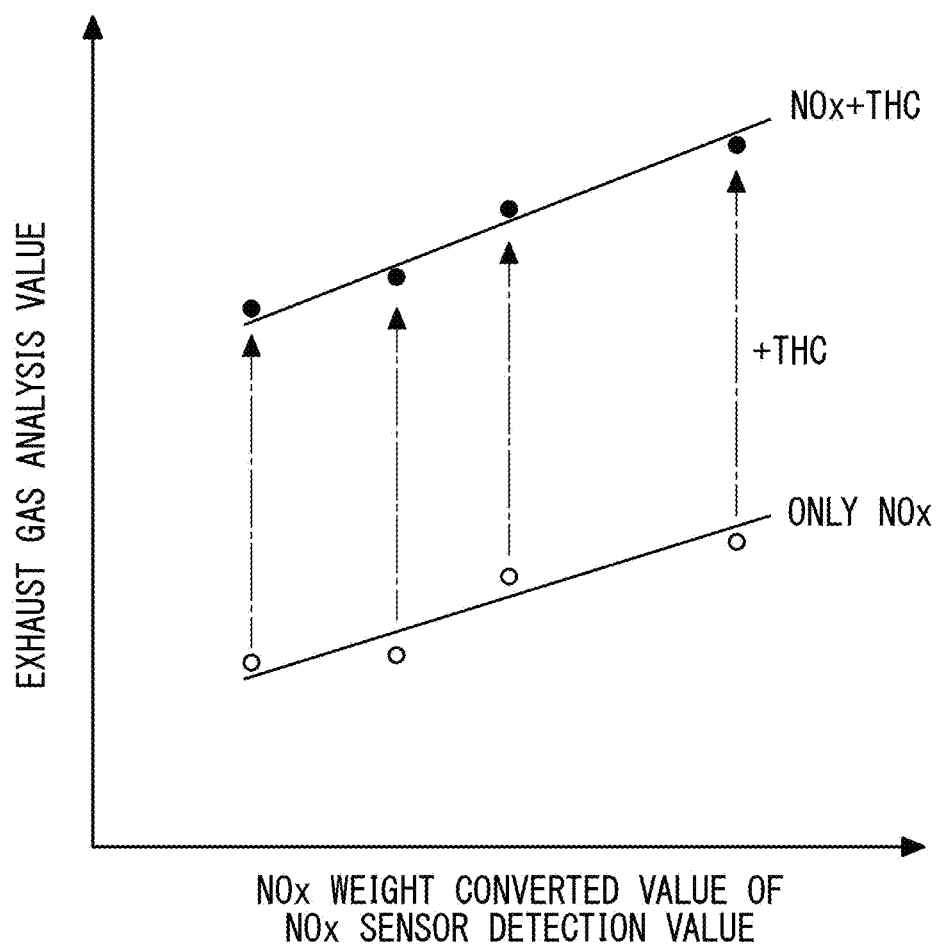
FIG. 3 is a drawing for describing a basic concept of a deterioration diagnosis.

FIG. 3 is a drawing for describing a basic concept of a deterioration diagnosis performed in the present embodiment. FIG. 3 illustrates a result assumed in a measurement and analysis in a case where the TWCs 601 in different deterioration states are sequentially mounted in a vehicle 1000 and the vehicle 1000 is driven in a certain drive condition, and then the measurement by the NOx sensor 703 and the analysis using an FID analyzer are performed in parallel on an exhaust air (exhaust gas) emitted from the TWCs 601 in each case.

Specifically, each of sets of data of the NOx weight converted value which is to be calculated from the NOx sensor detection value and the analysis value of NOx which is to be obtained from the FID analyzer (the weight value of NOx contained in the exhaust gas) is plotted with "○" (white circle).

As described above, the NOx weight converted value is one of the diagnosis object values, and when an amount of flow, pressure, and temperature of the exhaust air are already known, the NOx weight converted value can be calculated using a state equation (PV=nRT, n=w/M) by setting a molar weight of NOx to 30 which is a molar weight of NO.

Since both the analysis value of NOx and the NOx weight converted value are values for NOx in the exhaust gas, the analysis value of NOx and the NOx weight converted value obtained in the above condition naturally have a strong positive correlation. The inventors of the present invention actually confirm the correlationship in a specific case example. The TWC 601 with a proceeded deterioration of precious metal component has a low purification capability on NOx, thus such a TWC 601 discharges a large amount of NOx to the downstream side. Accordingly, the TWC 601 with the proceeded deterioration has a large NOx weight converted value in FIG. 3.

In the meanwhile, in FIG. 3, each of sets of data of a total analysis value of NOx+THC and the NOx weight converted value is also plotted with "●" (black circle). The former is obtained by adding the analysis value of THC, which is detected together with NOx at the time of the driving described above, to the analysis value of NOx. The concentration value of THC is supposed to be substantially equal to or larger than the concentration value of NOx.

Obtained after an earnest review by the inventors of the present invention are findings that the total weight value of NOx+THC also has a strong positive correlation with the NOx weight converted value as illustrated in FIG. 3 in the manner similar to the case of only NOx. Furthermore, also confirmed is that the value of a correlation coefficient in such a case (or a determination coefficient which is equal to a square of the correlation coefficient) is equivalent to the value for the analysis value of only NOx or closer to 1.

Generally, the TWC 601 with the proceeded deterioration of precious metal part has the low purification capability on THC in addition to NOx, however, the above findings suggest that the degree of deterioration of precious metal part in the TWC 601 can be comprehensively diagnosed based on a magnitude of an output value from the NOx sensor 703 (NOx sensor detection value) in accordance with the purification capability on NOx and the purification capacity on THC.

In the present embodiment, based on the above viewpoints, the diagnosis object value calculated based on the NOx sensor detection value and a predetermined diagnosis threshold value stored in the storage part 170 are compared with each other, thus the degree of deterioration of the precious metal part in the TWC 601 is diagnosed.

The diagnosis threshold value may be specified based on an equation indicating a linear relationship between the diagnosis object value obtained in a case where the TWCs 601 whose deterioration states are different and already known are sequentially mounted in the vehicle 1000 and driven in a predetermined drive mode matching a predetermined threshold setting condition (for example, in a chassis test) on a trial basis and the total weight value of NOx+THC measured with the analyzer at that time. The specified diagnosis threshold value is described in the storage part 170 in a form and value corresponding to a form of the diagnosis object value.

In the case of actually diagnosing the TWC 601 mounted in the vehicle 1000, the vehicle 1000 is driven in a drive condition where the diagnosis threshold value can be applied (in the same drive mode as that at the time of setting the diagnosis threshold value, for example), and when the diagnosis object value obtained at that time exceeds the threshold value, it is diagnosed that a deterioration exceeding the allowable limit occurs in the precious metal component in the TWC 601, and when the diagnosis object value is equal to or smaller than the threshold value, it is diagnosed that and a deterioration exceeding the allowable limit does not occur in the precious metal component in the TWC 601.

Alternatively, also applicable is a configuration that threshold values are set in stages and each threshold value and the NOx concentration value are compared with each other to diagnose the degree of deterioration of the precious metal component in the TWC 601 to be diagnosed in stages.

The reason that the correlation with the diagnosis object value of the NOx sensor 703 is revealed more remarkably for NOx+THC than for only NOx is not necessarily clarified. Examples of surmise include that the NOx sensor 703 having the above configuration has characteristics that not only NOx but also $NH_3$ are resolved in the measurement electrode 44, that is to say, a so-called $NH_3$ interference, thus there is a possibility that part of the current detected as the NOx current in the NOx sensor 703 occurs due to the resolution of $NH_3$ and $NH_3$ is emitted from the TWC 601 at the timing of purifying the exhaust gas during lean operation in the manner similar to the case of HC, thus an exhaust transition of $NH_3$ is similar to an exhaust transition of THC.

Figure 4:
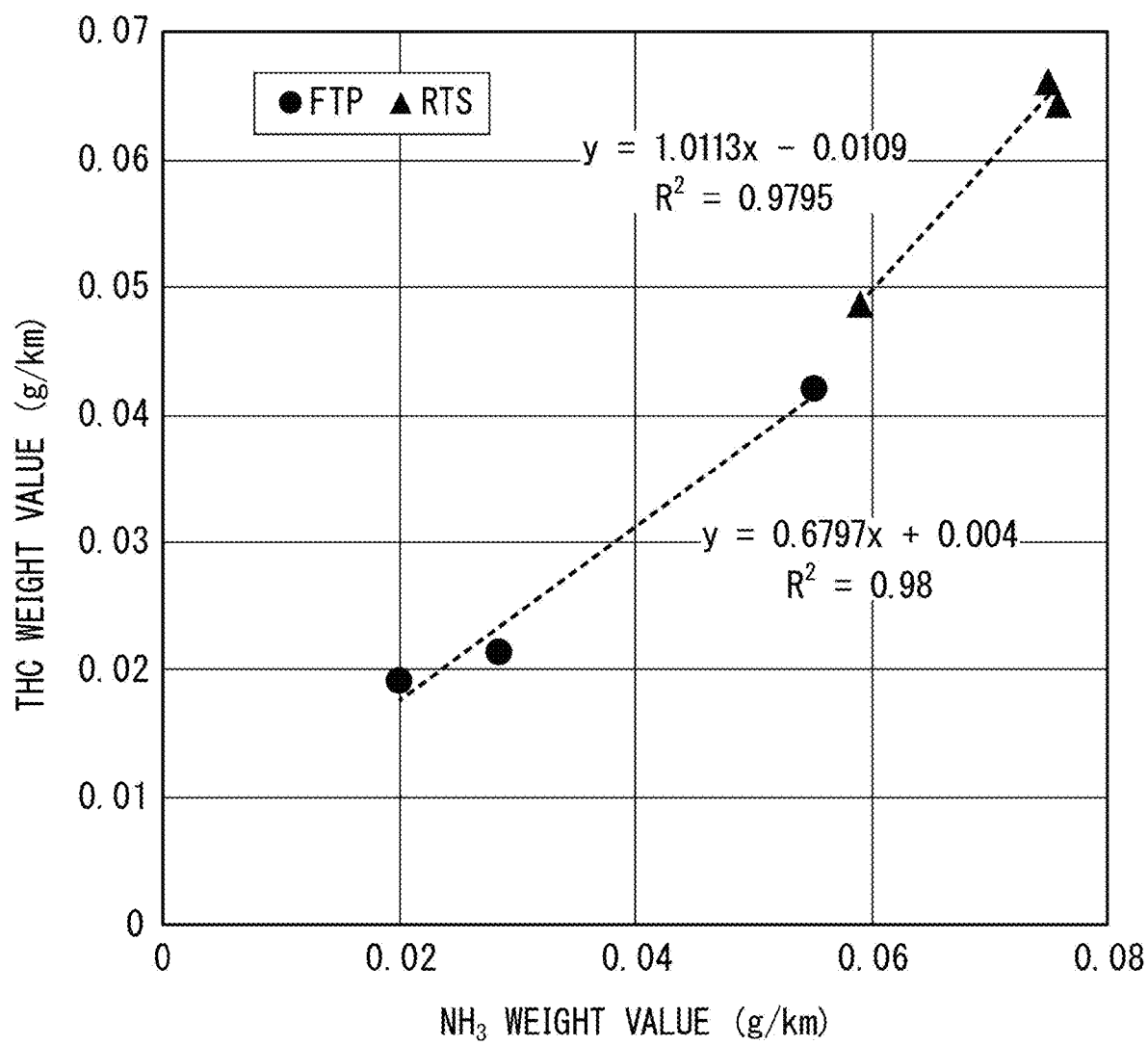
FIG. 4 is a drawing illustrating a result of a measurement of $NH_3$ and THC contained in the exhausted gas behind a TWC.

FIG. 4 is a drawing illustrating a result of a measurement of $NH_3$ and THC contained in the exhausted gas behind the TWC 601 in a state where a vehicle 1000 is made to travel in two travel modes of FTP-75 and RTS-95. A lateral axis x takes a weight value of $NH_3$ per unit of travel distance (unit: g/km) measured in FT-IR, and a vertical axis y takes a weight value of THC per unit of travel distance (unit: g/km) measured using the FID analyzer.

In these travel modes, each equation of approximate straight line and each value of the determination coefficient $R^2$ were as follows.

$FTP\text{-}75: y=0.6797x+0.0004\ R^2=0.98;$ $RTS\text{-}95: y=1.0113x+0.0109\ R^2=0.9795.$ These results suggest that there is a positive correlation between the $NH_3$ exhaust and the HC exhaust from the TWC 601. That is to say, these results are considered to confirm adequacy of the above surmise.

As described above, according to the present embodiment, the degree of deterioration of the precious metal component of the TWC can be diagnosed more preferably than the case of diagnosing only the exhaust amount of NOx.

EXAMPLE

Example 1

In the present example, the four TWCs 601 having different degrees of deterioration were prepared, and the actual vehicle 1000 was driven in a predetermined travel mode in a state where each of the four TWCs 601 are mounted in the vehicle 1000. At that time, the exhaust air (exhaust gas) was collected by a sampling bag on a downstream side with respect to the TWC 601 and the NOx sensor 703 in the pipe P, and the weight value of NOx and THC contained therein is obtained using a CLD analyzer and a FID analyzer, respectively, and the diagnosis object value was calculated based on the NOx sensor detection value being output from the NOx sensor 703 at that time.

A gasoline vehicle with 1.4 L displacement was used as the vehicle 1000. Used as the TWC 601 were a new component (also referred to as a fresh or a fresh component hereinafter) and three hydrothermal aging components made up by performing hydrothermal aging on fresh components for one hour, two hours, and ten hours at 1000° C., respectively, to simulatedly achieve deterioration states with different degrees of deterioration. The TWC 601 with a long hydrothermal aging time corresponds to that having a remarkable degree of deterioration. The hydrothermal aging was performed in an atmosphere containing 2% $O_2$, 10% $H_2O$, and $N_2$ as a residual. FTP-75 and RTS-95 were adopted as the travel modes.

In total having a different combination of the TWC 601 and the travel mode, the NOx weight converted value of the vehicle 1000 per unit of travel distance (unit: g/km) was calculated based on the NOx sensor detection value (NOx current value) being output from the NOx sensor 703 in the cases of eight patterns, and calculated was the total weight value of NOx+THC per unit of travel distance (unit: g/km) contained in the exhaust gas collected by the sampling bag during the traveling. FIG. 5 is a drawing in which the case in each mode is plotted, the lateral axis x indicating the former value and the vertical axis y indicating the latter value.

A regression analysis was individually performed on each of FTP-75 and RTS-95 using the obtained four levels of data to obtain an equation of approximate straight line indicated by a dotted line in FIG. 5 and calculate the determination coefficient $R^2$.

Also as illustrated in FIG. 5, in these travel modes, each equation of approximate straight line and each value of the determination coefficient $R^2$ were as follows.

$FTP\text{-}75: y=4.7415x-0.0242\ R^2=0.9919;$ $RTS\text{-}95: y=4.8743x+0.0021\ R^2=0.9780.$ Confirmed from the above results is that there is a strong positive correlation between the NOx weight converted value obtained from the NOx sensor detection value and the total weight value of NOx+THC per unit of travel distance in both travel modes.

That is to say, this suggests that, when the vehicle 1000 is made to travel in the predetermined travel mode, as described in the present example, using the plurality of TWCs 601 in which the degree of deterioration is previously specified, and the approximate straight line as is illustrated in FIG. 5 is created thereafter to define the diagnosis threshold value based on the approximate straight line, the deterioration diagnosis of the TWC 601 whose degree of deterioration is unknown can be performed by comparing the NOx weight converted value per unit of travel distance at the time when the vehicle 1000 with the TWC 601 is made to travel in the predetermined travel mode, with the diagnosis threshold value.

Example 2

Figure 6:
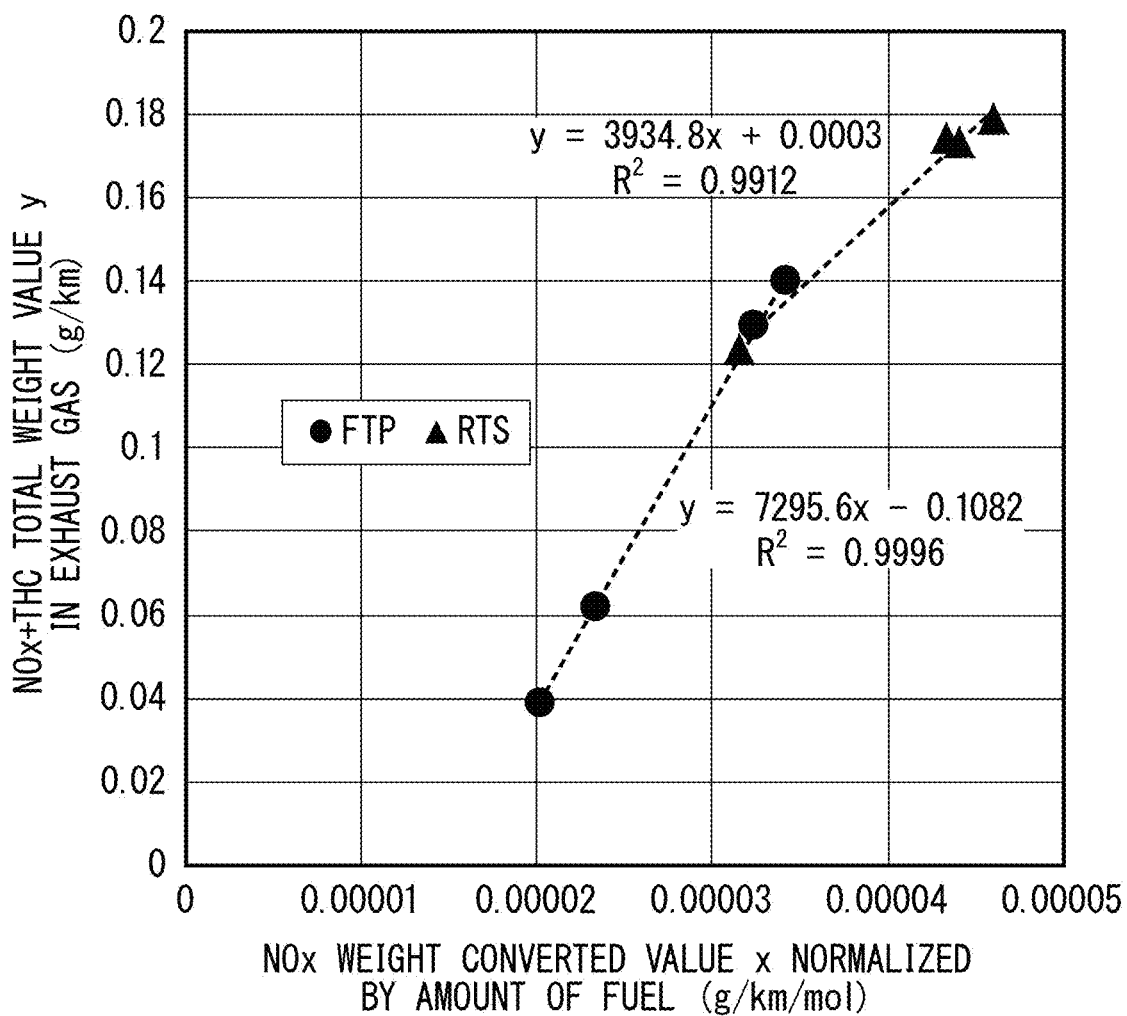
FIG. 6 is a drawing in which a total weight value of NOx+THC per unit of travel distance is plotted with respect to a normalized NOx weight converted value per unit of travel distance in an example 2.

In the present example, the NOx weight converted value per unit of travel distance which is the diagnosis object value in the example 1 is converted into the value normalized by the amount of fuel used during the traveling of the vehicle 1000 (the normalized NOx weight converted value), and an evaluation similar to that in the example 1 was performed. FIG. 6 is a drawing in which a value of the lateral axis x in FIG. 5 is converted into a normalized NOx weight converted value and the case in each mode is plotted anew. The normalization was performed on an assumption that THC is totally made of $C_3H_8$, and a sum of the weight value of THC in the exhaust gas specified using the FID analyzer and the weight value of $CO+CO_2$ in the exhaust gas specified using the NDIR analyzer is defined as the amount of fuel.

Also in the present example, a regression analysis was individually performed on each of FTP-75 and RTS-95 using the obtained four levels of data in the manner similar to that in the example 1 to obtain an equation of approximate straight line indicated by a dotted line in FIG. 6 and calculate the determination coefficient $R^2$.

Also as illustrated in FIG. 6, in these travel modes, each equation of approximate straight line and each value of the determination coefficient $R^2$ were as follows.

$FTP\text{-}75: y=7295.6x-0.1082\ R^2=0.9996;$ $RTS\text{-}95: y=3934.8x+0.0003\ R^2=0.9912.$ That is to say, the determination coefficient $R^2$ is closer to 1 than the case illustrated in FIG. 5 in both travel modes. The above result suggests that there is a possibility that the deterioration diagnosis can be performed with higher accuracy by applying the normalized NOx weight converted value to the diagnosis object value.

Example 3

Both the example 1 and the example 2 only indicate that there is the correlationship between the diagnosis object value derived from the output from the NOx sensor 703 and the total weight value of NOx+THC in each individual travel mode. Thus, when the deterioration diagnosis is performed based on the above correlationship, the vehicle needs to travel in the same travel mode as that in setting the diagnosis threshold value.

Figure 7:
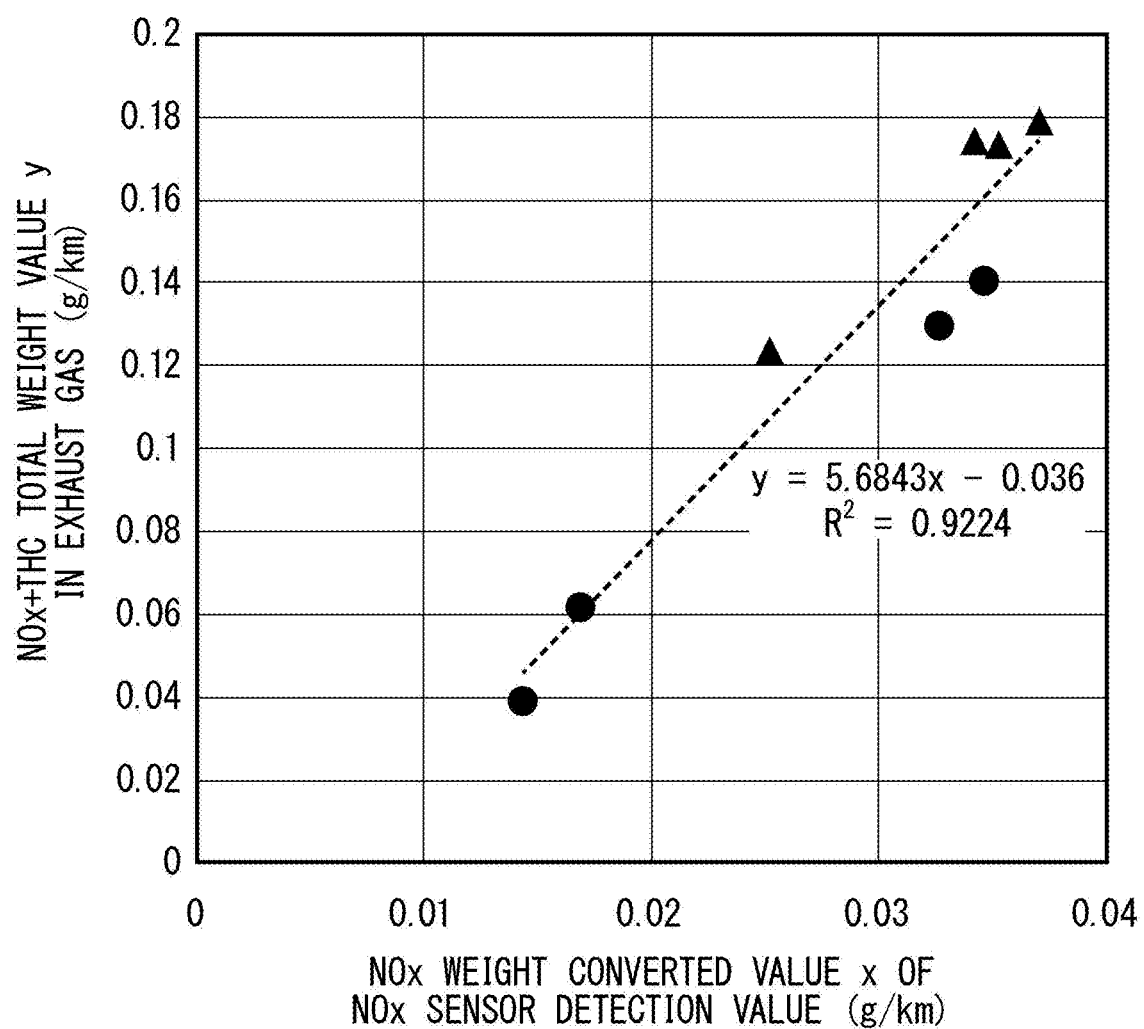
FIG. 7 is a drawing illustrating a result of a regression analysis performed on all data obtained in the example 1.
Figure 8:
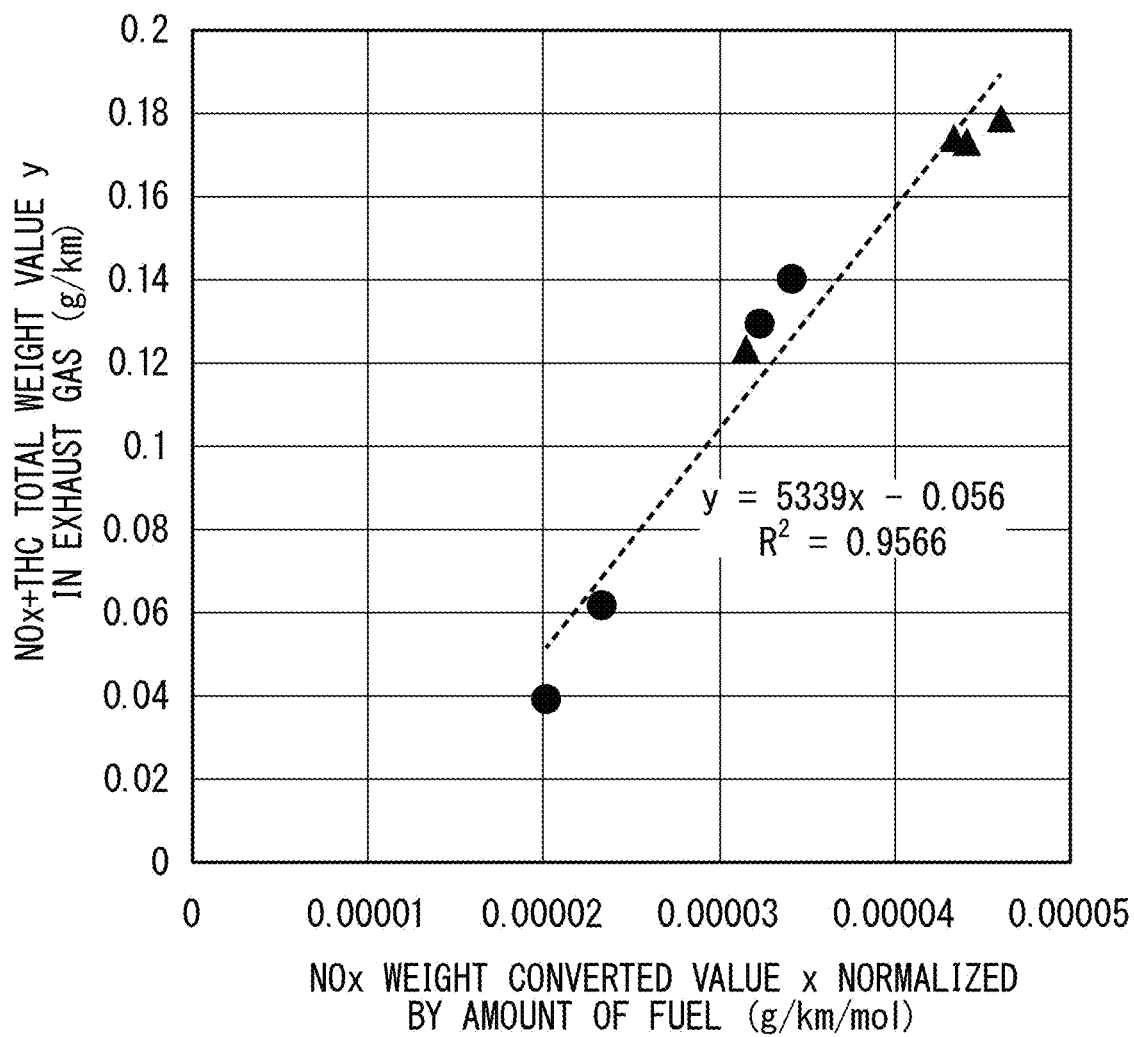
FIG. 8 is a drawing illustrating a result of a regression analysis performed on all data obtained in the example 2.

In the present example, a regression analysis was performed on all of data of eight levels obtained in the two travel modes in the example 1 and the example 2 to obtain an equation of approximate straight line and calculate the determination coefficient $R^2$. FIG. 7 is a drawing illustrating the approximate straight line obtained in the regression analysis in the plot of the same data as that in FIG. 5 in the example 1. FIG. 8 is a drawing illustrating the approximate straight line obtained in the regression analysis in the plot of the same data as that in FIG. 6 in the example 2.

Also as illustrated in FIG. 7, the equation of approximate straight line corresponding to all the data of eight levels in the example 1 and the determination coefficient $R^2$ were as follows.

$$y=5.6843x-0.036 \ R^2=0.9224.$$

Also as illustrated in FIG. 8, the equation of approximate straight line corresponding to all the data of eight levels in the example 2 and the determination coefficient $R^2$ were as follows.

$$y=5339x-0.056 \ R^2=0.9566.$$

The both cases indicate that the value of the determination coefficient is small compared with the approximate straight line obtained in each individual travel mode, but there is sufficiently a strong correlation between x and y. This suggests that the vehicle travels in the plurality of travel modes different from each other in setting the diagnosis threshold value, and the appropriate diagnosis object value is set based on the result, however, in the actual deterioration diagnosis, the vehicle travels without a specific limitation on the travel mode, and the result can be compared with the diagnosis threshold value.

Comparison Example 1

An evaluation was performed in the manner similar to that in the example 1 except that only NOx contained in the collected exhaust gas was subjected to the evaluation.

Figure 9:
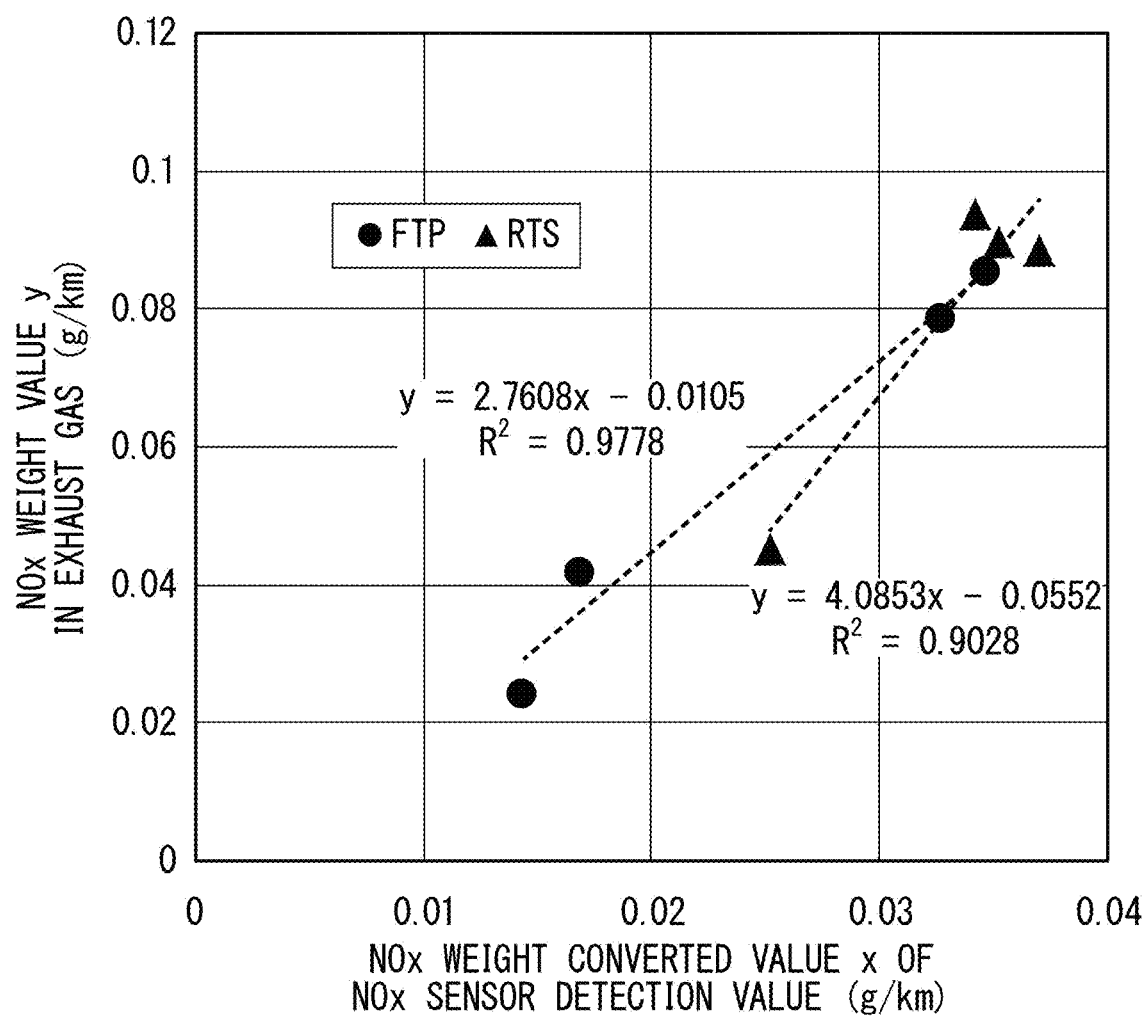
FIG. 9 is a drawing in which a weight value of NOx per unit of travel distance is plotted with respect to an NOx weight converted value per unit of travel distance in a comparison example 1.

FIG. 9 is a drawing in which each mode is plotted as is in FIG. 5, except that the value of vertical axis y indicates the weight value of NOx contained in the exhaust gas collected by the sampling bag during the traveling per unit of travel distance (unit: g/km).

A regression analysis was performed on each of FTP-75 and RTS-95 in the manner similar to that in the example 1 to obtain an equation of approximate straight line indicated by a dotted line in FIG. 9 and calculate the determination coefficient $R^2$.

Also as illustrated in FIG. 9, the equation of approximate straight line and the value of determination coefficient $R^2$ in both travel modes were as follows.

$$FTP\text{-}75: y=2.7608x-0.0105 \ R^2=0.9778;$$

$$RTS\text{-}95: y=4.0853x-0.0552 \ R^2=0.9028.$$

In both cases, the determination coefficient $R^2$ exceeds 0.9, and recognized is that there is a strong correlation between x and y, however, the value is lowered compared with the case in the example 1. The above result and the result in the example 1 indicate that it is appropriate to use the NOx sensor detection value being output from the NOx sensor 703 as an index for determining the degree of deterioration of the precious metal component of the TWC 601 and determine the diagnosis threshold value based on the overall purification capability on NOx and THC in the TWC 601.

Comparison Example 2

Obtained by applying a known Cmax method was an oxygen absorption amount in a case where the four TWCs 601 used in the example 1 were mounted in the vehicle 1000 used in the example 1, and the vehicle 1000 was made to travel in each travel mode of FTP-75 and RTS-95.

Figure 10:
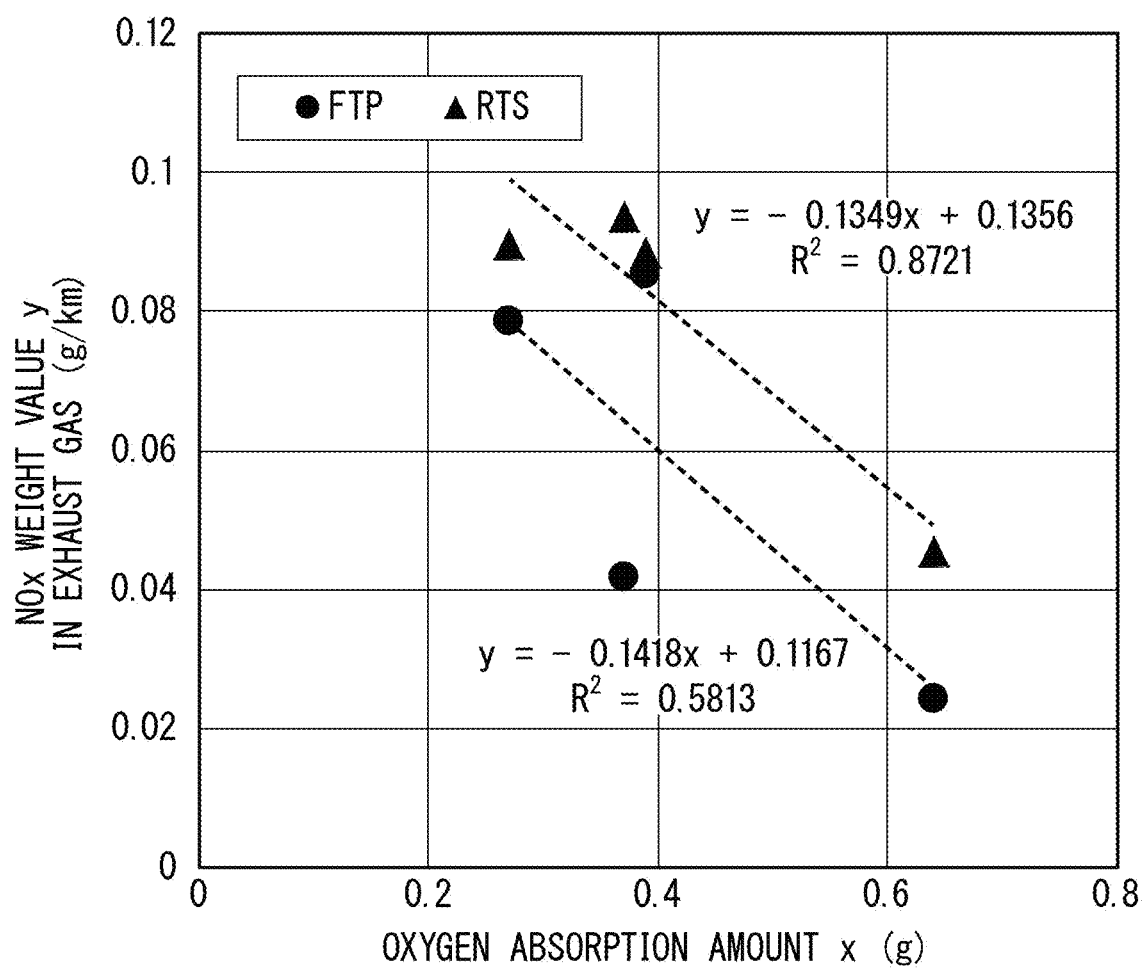
FIG. 10 is a drawing in which a weight value of NOx per unit of travel distance is plotted with respect to an oxygen absorption amount in a comparison example 2.
Figure 11:
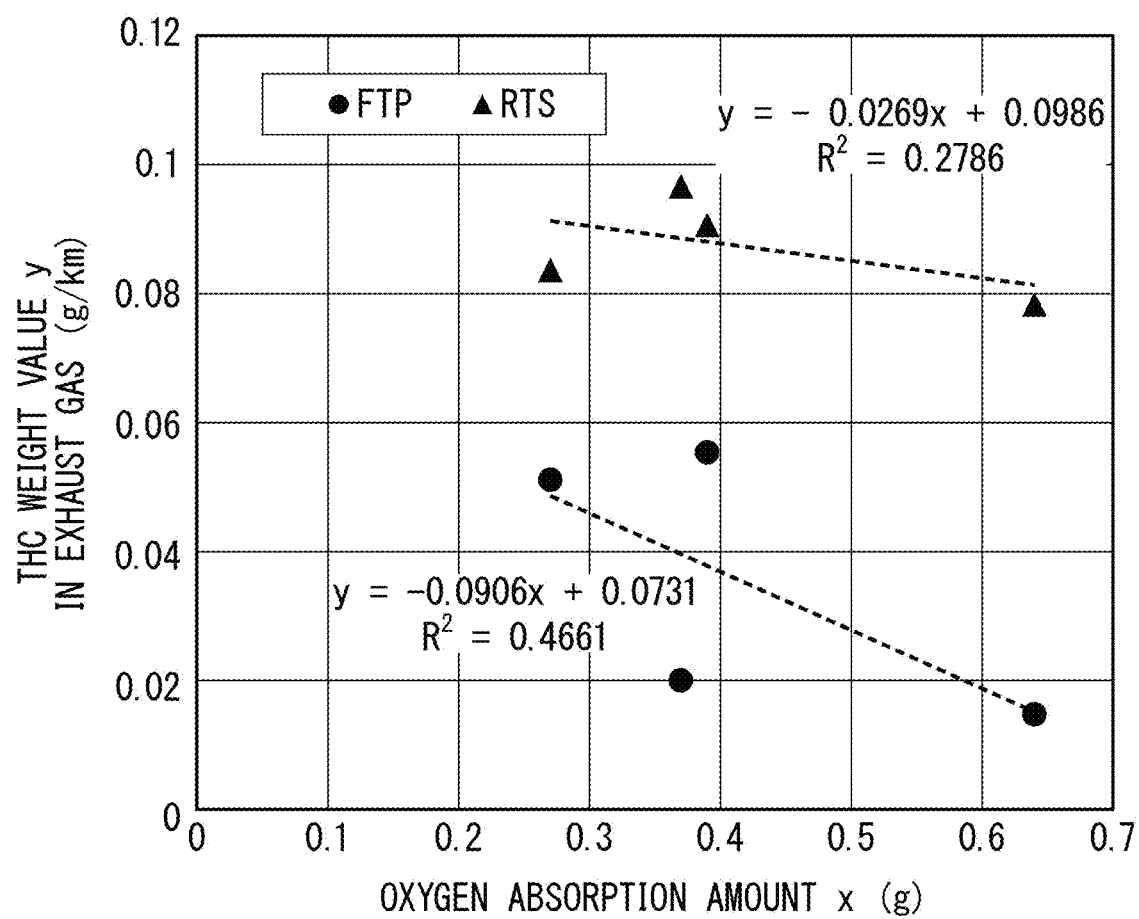
FIG. 11 is a drawing in which a weight value of THC per unit of travel distance is plotted with respect to an oxygen absorption amount in the comparison example 2.

FIG. 10 is a drawing in which each mode is plotted while lateral axis x indicates the oxygen absorption amount obtained by the Cmax method (unit: g) and the vertical axis y indicates the weight value of NOx contained in the exhaust gas collected by the sampling bag during the traveling per unit of travel distance (unit: g/km) in the cases of eight patterns in total having a different combination of the TWC 601 and the travel mode. FIG. 11 is a drawing in which each mode is plotted while the lateral axis x is the same as that in FIG. 10 and the vertical axis y indicates the weight value of THC contained in the exhaust gas per unit of travel distance (unit: g/km).

A regression analysis was individually performed on each of FTP-75 and RTS-95 using the obtained four levels of data to obtain an equation of approximate straight line indicated by a dotted line in FIG. 10 and FIG. 11 and calculate the determination coefficient $R^2$.

Also as illustrated in FIG. 10, the equation of approximate straight line and the value of determination coefficient $R^2$ in the case of NOx were as follows.

$$FTP\text{-}75: y=-0.1418x+0.1167 \ R^2=0.5813;$$

$$RTS\text{-}95: y=-0.1349x+0.1356 \ R^2=0.8721.$$

Also as illustrated in FIG. 11, the equation of approximate straight line and the value of determination coefficient $R^2$ in the case of THC were as follows.

$$FTP\text{-}75: y=-0.0906x+0.0731 \ R^2=0.4661;$$

$$RTS\text{-}95: y=-0.0269x+0.0986 \ R^2=0.2786.$$

A sufficient correlation was not obtained between the case of NOx illustrated in FIG. 10 and the oxygen absorption amount and between the case of THC illustrated in FIG. 11 and the oxygen absorption amount. The above result indicates that it is not appropriate to use the oxygen absorption amount as a direct index of diagnosis for the purification capability on NOx and THC in the TWC 601.

While the invention has been shown and described in detail, the foregoing description is in all aspects illustrative and not restrictive. It is therefore understood that numerous modifications and variations can be devised without departing from the scope of the invention.

What is claimed is:

1. A system of diagnosing a degree of deterioration of a catalyst purifying an exhaust gas emitted from an internal combustion engine mounted in a vehicle, the catalyst including a precious metal component and a ceramic part, the system comprising:
   a drive control element configured and disposed to control intake air and a fuel injection in the internal combustion engine, thereby controlling a drive state of the internal combustion engine;
   an NOx sensor provided on a downstream side with respect to the catalyst in an exhaust path of the exhaust gas;
   a diagnosis element configured and disposed to compare at least a diagnosis object value corresponding to an output from the NOx sensor and a predetermined diagnosis threshold value, thereby diagnosing a degree of deterioration of the catalyst; and
   a storage element storing the diagnosis threshold value, wherein
   the diagnosis threshold value is previously determined based on a correlationship between the diagnosis object value and at least a total weight value of NOx and THC in the exhaust gas through the catalyst in a state where the vehicle travels under a constant threshold value setting condition, and
   the diagnosis element diagnoses that a deterioration occurs in the precious metal component in the catalyst when the diagnosis object value obtained while the vehicle travels under a diagnosable condition exceeds the diagnosis threshold value.

2. The catalyst deterioration diagnosis system according to claim 1, wherein
   the diagnosis threshold value is determined based on a correlationship between the diagnosis object value at a time when the vehicle travels in one travel mode determined as the constant threshold value setting condition and the total weight value, and
   the diagnosis element diagnoses a degree of deterioration of the catalyst when the vehicle travels in the one travel mode.

3. The catalyst deterioration diagnosis system according to claim 1, wherein
   the diagnosis threshold value is determined based on one correlationship between all of the diagnosis object values and all of the total weight values at a time when the vehicle travels in each of a plurality of travel modes, which are determined as the constant threshold value setting condition and are different from each other.

4. A method of diagnosing a degree of deterioration of a catalyst purifying an exhaust gas emitted from an internal combustion engine mounted in a vehicle, the catalyst including a precious metal component and a ceramic part, the method comprising steps of:
   a) locating an NOx sensor on a downstream side with respect to the catalyst in an exhaust path of the exhaust gas;
   b) setting a diagnosis threshold value; and
   c) comparing at least a diagnosis object value corresponding to an output from the NOx sensor and the diagnosis threshold value which is predetermined in the step b), thereby diagnosing a degree of deterioration of the catalyst, wherein
   in the step b), the diagnosis threshold value is determined based on a correlationship between the diagnosis object value and at least a total weight value of NOx and THC in the exhaust gas through the catalyst in a state where the vehicle travels under a constant threshold value setting condition, and
   in the step of c), it is diagnosed that a deterioration occurs in the precious metal component in the catalyst when the diagnosis object value obtained while the vehicle travels under a diagnosable condition exceeds the diagnosis threshold value.

5. The method of diagnosing the deterioration of the catalyst according to claim 4, wherein
   in the step of b), the diagnosis threshold value is determined based on a correlationship between the diagnosis object value at a time when the vehicle travels in one travel mode determined as the constant threshold value setting condition and the total weight value, and
   in the step of c), a degree of deterioration of the catalyst is diagnosed when the vehicle travels in the one travel mode.

6. The method of diagnosing the deterioration of the catalyst according to claim 4, wherein
   in the step of b), the diagnosis threshold value is determined based on one correlationship between all of the diagnosis object values and all of the total weight values at a time when the vehicle travels in each of a plurality of travel modes, which are determined as the constant threshold value setting condition and are different from each other.

* * * * *